United States Patent
Metzler et al.

(10) Patent No.: US 6,659,559 B1
(45) Date of Patent: Dec. 9, 2003

(54) BEARING

(75) Inventors: Hubert Metzler, Ober-Olm (DE); Stefan Emmrich, Frankfurt am Main (DE)

(73) Assignee: Kochendorfer + Kiep Metallverarbeitung GmbH, Kriftel (DE)

( * ) Notice: Subject to any disclaimer, the term of this patent is extended or adjusted under 35 U.S.C. 154(b) by 0 days.

(21) Appl. No.: 09/980,514

(22) PCT Filed: Apr. 28, 2000

(86) PCT No.: PCT/EP00/03875

§ 371 (c)(1),
(2), (4) Date: Mar. 1, 2002

(87) PCT Pub. No.: WO00/66390

PCT Pub. Date: Nov. 9, 2000

(30) Foreign Application Priority Data

| May 4, 1999 | (DE) | ............ 199 20 386 |
| Nov. 17, 1999 | (DE) | ............ 299 20 146 U |

(51) Int. Cl.$^7$ ............... B60N 2/20; B60N 2/22
(52) U.S. Cl. ............... 297/378.12; 16/358
(58) Field of Search ............ 297/378.12, 378.11; 16/358, 360, 361

(56) References Cited

U.S. PATENT DOCUMENTS

| 4,882,807 | A | * | 11/1989 | Frye et al. | ............ 16/358 |
| 4,953,259 | A | * | 9/1990 | Frye et al. | ............ 16/358 |
| 5,476,307 | A | * | 12/1995 | Whalen | ...... 297/378.11 X |
| 5,894,634 | A | * | 4/1999 | Nithammer et al. | ...... 16/358 X |
| 6,292,981 | B1 | * | 9/2001 | Ford et al. | ............ 16/358 |

* cited by examiner

*Primary Examiner*—Anthony D. Barfield
(74) *Attorney, Agent, or Firm*—Bachman & LaPointe, P.C.

(57) ABSTRACT

A bearing for a part of a seat, such as, a pivotal armrest or a folding backrest. The bearing comprises a bearing arm which is connected to a fixed bearing block in an articulated manner. A locking element should be assigned to the bearing arm. The locking element proceeds to a stop when the bearing arm is quickly rotated around a joint but releases the bearing arm when the same is slowly rotated.

10 Claims, 3 Drawing Sheets

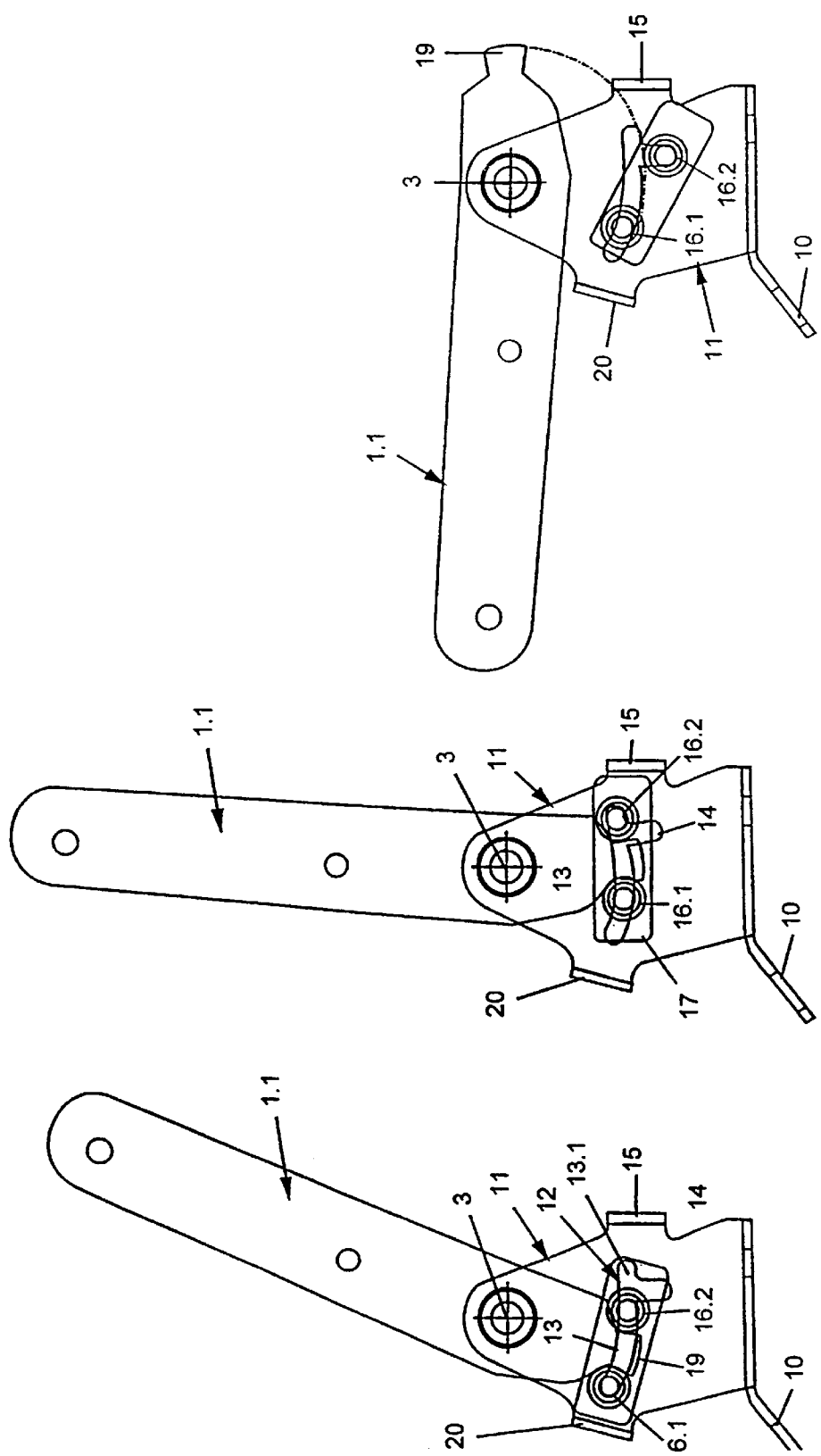

ved in an
BEARING

The invention relates to a bearing, in particular for a part of a seat, such as a pivotable armrest or a backrest which can be folded over, having a bearing arm which is connected in an articulated manner to a positionally fixed bearing bracket.

Armrests and, in particular, backrests of vehicles are, if possible, to be designed such that they can be pivoted or folded over. This applies both for front seats and for rear seats. However, the present invention is not to be restricted solely to backrests of vehicles, but applies to all backrests which are to be designed such that they can be folded over.

It is desirable for it to be possible for backrests of this type to be folded over easily with normal handling. In contrast, they are to lock, for example, in the event of an accident, so that they do not fling or push the seated person even further forward.

However, the present invention is not to be restricted to a bearing for a part of a seat. It can be used wherever pivoting and rotating bearings are required.

The present invention is based on the object of developing a bearing of the above-mentioned type which achieves this advantage by extremely simple means.

This object is achieved in that the bearing arm is assigned a locking element which, in the event of a rapid rotation of the bearing arm, travels around the joint onto a stop, but in the event of slow rotation releases the bearing arm.

If, for example, a motor vehicle is involved in an accident, then as a consequence of the impact the bearing arm rotates very rapidly about its rotating joint, in which case the bearing arm or the locking element also impacts against the stop and therefore cannot be rotated further.

If, in contrast, the backrest tips forward slowly, the locking element releases the bearing arm, with the result that its rotating movement is not restricted until the bearing movement is in its desired end position.

The locking element is preferably to be arranged on the bearing bracket, in which case the fixed stop can also be situated on the bearing bracket, since it is to interact with the locking element.

The locking element is guided in a slotted guide which, in the present exemplary embodiment, is of very simple construction, but permits a very effective guidance of the locking element. The slotted guide is a slot which runs horizontally or obliquely and from which a lug-shaped recess which runs approximately vertically downward leads away in the vicinity of the stop.

The locking element in turn has two spaced-apart sliding bodies which run in the slotted guide. The sliding bodies interact with the slotted guide in such a manner that, in the event of a rapid rotating movement of the bearing arm, the sliding bodies remain in the slot, so that a lug which belongs to the bearing arm and is held between the two sliding bodies is not released.

If, in contrast, a slow rotation takes place, then one sliding body falls into the downwardly orientated recess and therefore releases the lug of the bearing arm.

An arrangement of this type is of very simple construction and manages with few components, but operates extremely effectively.

Further advantages, features and details of the invention emerge from the following description of preferred exemplary embodiments and with reference to the drawing; in which FIG. 1 shows a perspective view of a bearing according to the invention for a backrest which can be folded over;

FIGS. 3 to 5 show various positions of use of the bearing according to the invention from FIG. 1.

Figure 1:
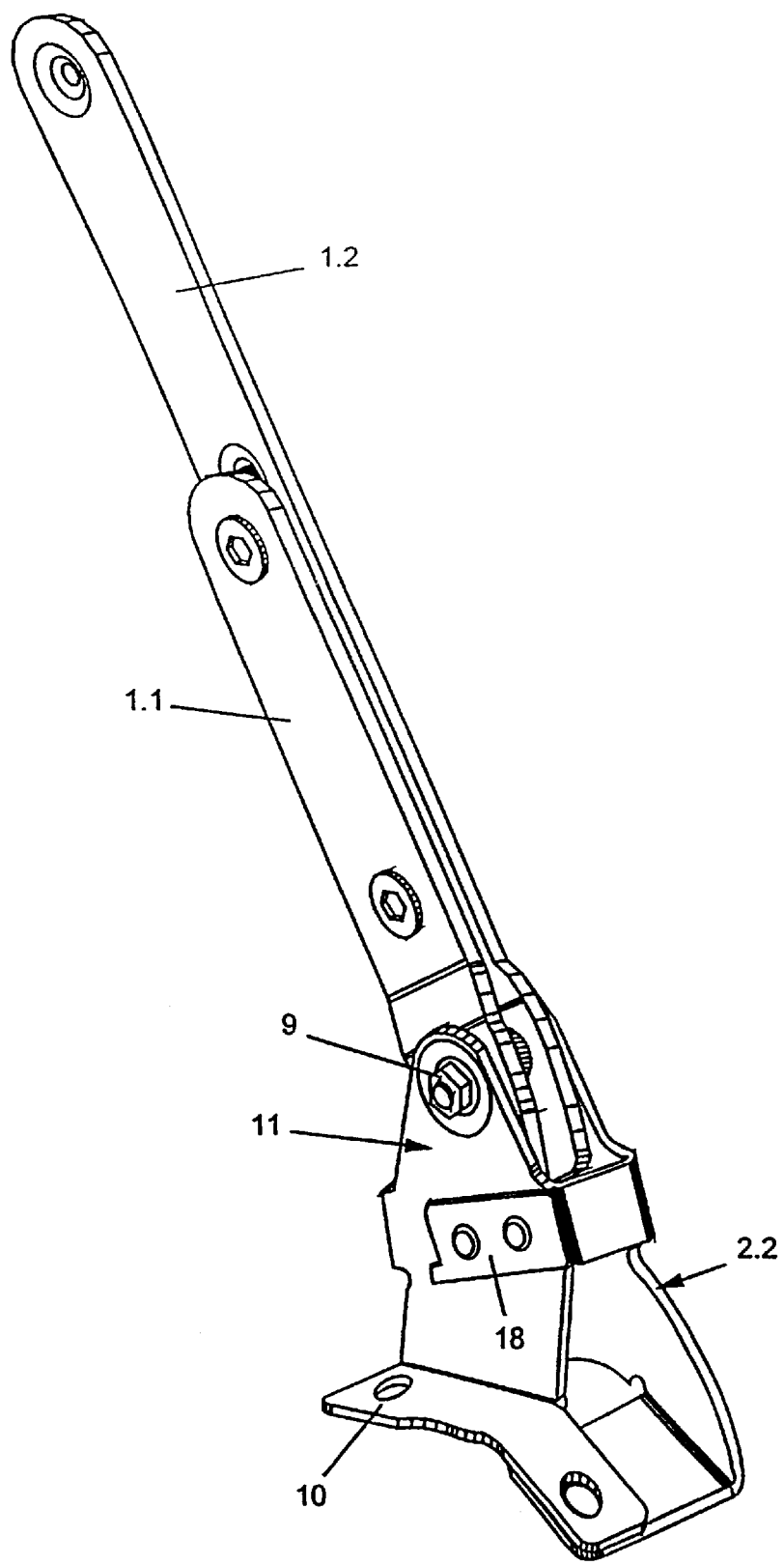
Figure 2:
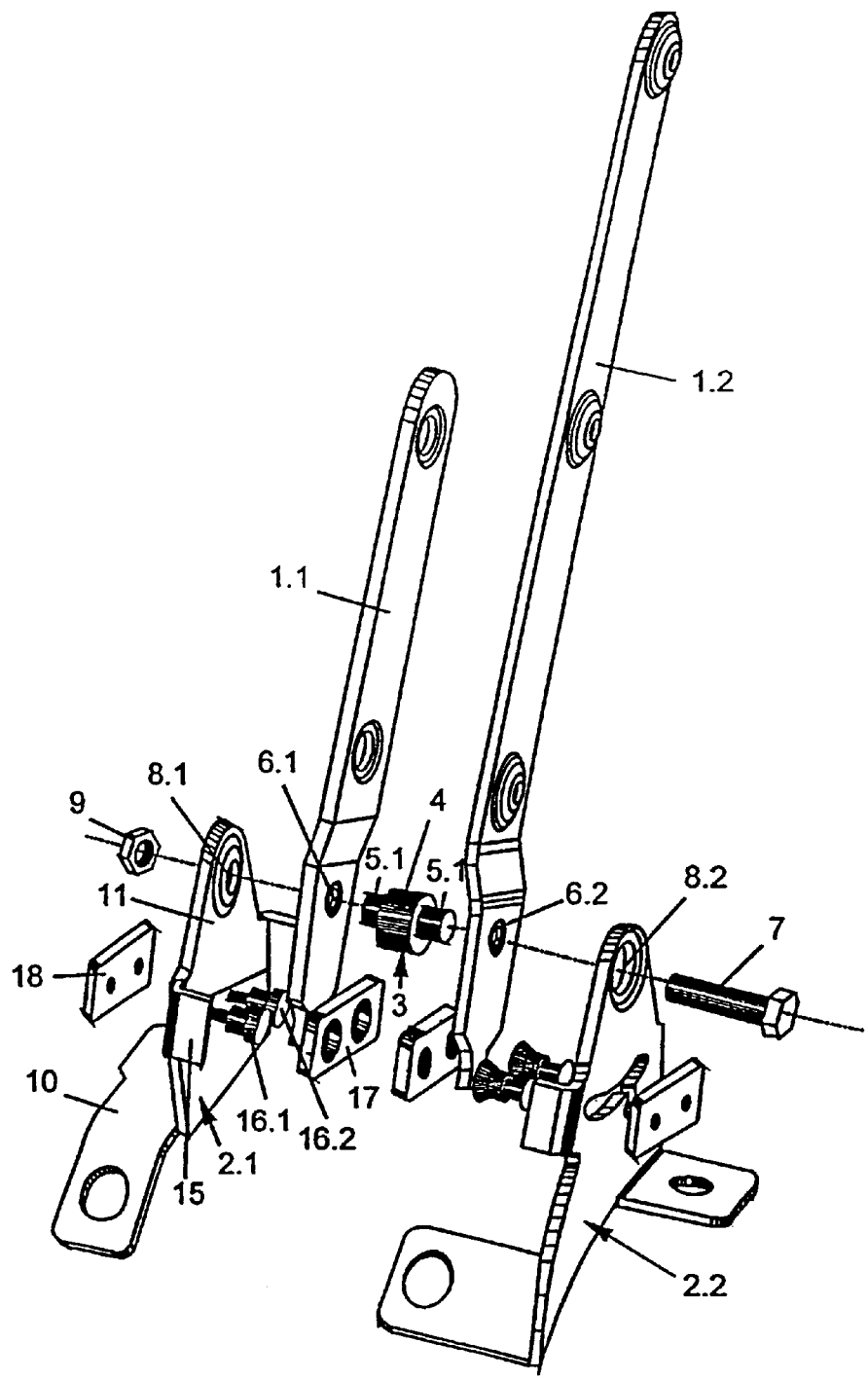
FIG. 2 shows a perspective view of the bearing according to FIG. 1 in an exploded illustration.

A bearing according to the invention for a backrest which can be folded over (not shown in more detail) has, according to FIGS. 1 and 2, two bearing arms 1.1 and 1.2. In the present exemplary embodiment, the bearing arm 1.1 is designed such that it is shorter than the bearing arm 1.2, since the bearing arm 1.2 is conceived for a central part of a rear-bench backrest which also contains elements and in particular articulation points for a seatbelt.

Each bearing arm 1.1 and 1.2 is assigned to a bearing bracket 2.1 and 2.2, only the articulation on one bearing bracket being described below. The other bearing arm is articulated on the other bearing bracket in a corresponding manner.

However, both bearing arms 1.1 and 1.2 have a common articulated connection which has a rotating joint 3 which essentially comprises a spacer element 4 from which sleeve sections 5.1 and 5.2 protrude on both sides. In the position of use, each sleeve section 5.1 and 5.2 sits in a cylindrical recess 6.1 and 6.2 in the respective bearing arm 1.1 and 1.2, in which case the bearing arms 1.1 and 1.2 can rotate around these sleeve sections 5.1 and 5.2.

In order to secure the bearing arms 1.1 and 1.2 and the rotating joint 3 use is made of a screw 7 which passes through a hole 8.2 in the bearing bracket 2.2, through the recess 6.2, the sleeve section 5.2, the spacer element 4 and the sleeve section 5.1, the recess 6.1 and a further hole 8.1 in the other bearing bracket 2.1 and is secured there by a nut 9.

The bearing bracket 2.1 is of angular design and has a base-supporting means 10 for securing, for example, to the chassis of a vehicle. Protruding from this base-supporting means 10 is a bearing elbow 11 which has the hole 8.1 and is therefore used for securing the bearing arm 1.1.

A slotted guide 12, which can be seen better in FIGS. 3 to 5, is formed in the bearing elbow 11. The slotted guide 12 comprises a slot 13 which is curved horizontally or obliquely and from which a lug-shaped recess 14 leads away approximately vertically downward in the vicinity of one end. However, the slot 13 continues further beyond the recess 14 by means of a recess part 13.1.

The slotted guide 12 is orientated toward a stop 15 which, in the present exemplary embodiment, is bent off from the bearing elbow 11.

The slotted guide 12 is demonstrated by two rivets 16.1 and 16.2 which can slide in the slotted guide 12 as sliding bodies.

On the side which the stop 15 is on, the rivets 16.1 and 16.2 are connected to a stop plate 17 and, on the opposite side, are connected to a retaining plate 18.

The manner in which the present invention functions is as follows:

In the starting position, the bearing arm is situated in a position as illustrated in FIG. 3. In this case, a lug 19 of the bearing arm 1.1 is held between the two rivets 16.1 and 16.2, the rivet 16.1 being situated at the end of the slot 13 remote from the stop 15. In order also to restrict a movement of the stop plate 17 on the left-hand side, a further stop 20 designed in a similar manner to the stop 15 may be provided.

If the bearing arm 1.1 is now pivoted rapidly forward together with a backrest (not shown in more detail), as is the case, for example, in the event of a crash, the rivet 16.2, while being guided in the slot 13, jumps over the recess 14 and enters into the part 13.1 of the slot. The stop plate 17 impacts against the stop 15, with the result that a further pivoting movement of the bearing arm 1.1 is impossible, since the lug 19 is furthermore situated between the two stops 16.1 and 16.2.

If, in contrast, a slow movement of the bearing arm 1.1 around the rotating joint 3 is carried out, then, as shown in FIG. 5, the rivet 16.2 falls into the recess 14, so that the lug 19 of the bearing arm 1.1 is released. The bearing arm 1.1 and, together with it, the backrest, can thereby be folded completely forward.

If the bearing arm 1.1 is put upright, the lug 19 enters into the spacing between the two rivets 16.1 and 16.2, presses the rivet 16.1 along the slot in the direction of the stop 20, so that the rivet 16.2 can slide out of the recess 14, and the lug 19 is thus retained fixedly again between the two rivets 16.1 and 16.2.

What is claimed is:

1. A bearing for a part of a seat which can be folded over, comprises a bearing arm (1.1, 1.2) which is connected in an articulated manner on a joint on a positionally fixed bearing bracket (2.1, 2.2), the bearing arm (1.1, 1.2) includes a locking element which is guided in a slotted guide (12), the slotted guide (12) has a curved slot (13, 13.1) and a lug-shaped recess (14) which runs downwards and leads away from the curved slot wherein, in the event of a rapid rotation of the bearing arm (1.1, 1.2), the locking element rotates around the joint and abuts a stop (15), and in the event of slow rotation the locking element releases the bearing arm (1.1, 1.2).

2. The bearing as claimed in claim 1, wherein the locking element (17) is arranged on the bearing bracket (2.1, 2.2).

3. The bearing as claimed in claim 1, wherein the locking element (17) is assigned a fixed stop (15) on the bearing bracket (2.1, 2.2).

4. The bearing as claimed in claim 1, wherein the slotted guide (12) runs toward the stop (15).

5. The bearing as claimed in claim 1, wherein the locking element (17) runs in the slotted guide (12) by means of two spaced-apart sliding bodies (16.1, 16.2).

6. A The bearing as claimed in claim 5, wherein the sliding bodies are rivets (16.1, 16.2).

7. The bearing as claimed in claim 1, wherein a spacing between the two sliding bodies (16.1, 16.2) serves for temporarily holding one end of the bearing arm (1.1, 1.2).

8. The bearing as claimed in claim 7, wherein the bearing arm (1.1, 1.2) engages between the two sliding bodies (16.1, 16.2) by means of a lug (19) integrally formed on it.

9. The bearing as claimed in claim 7, wherein the locking element is a stop plate (17) on a side of the slot (13) which releasably retains the bearing arm (1.1, 1.2).

10. The bearing as claimed in claim 9, wherein the stop plate (17) includes a retaining plate (18) on an other side of the slot (13), and the two plates are connected to each other through the slotted guide (12) via the guide (12) via the two sliding bodies (16.1, 16.2).

* * * * *